G. C. HOSCH.
PUSH BUTTON CONTROLLED SHUTTER.
APPLICATION FILED MAR. 9, 1921.
1,396,577.
Patented Nov. 8, 1921.
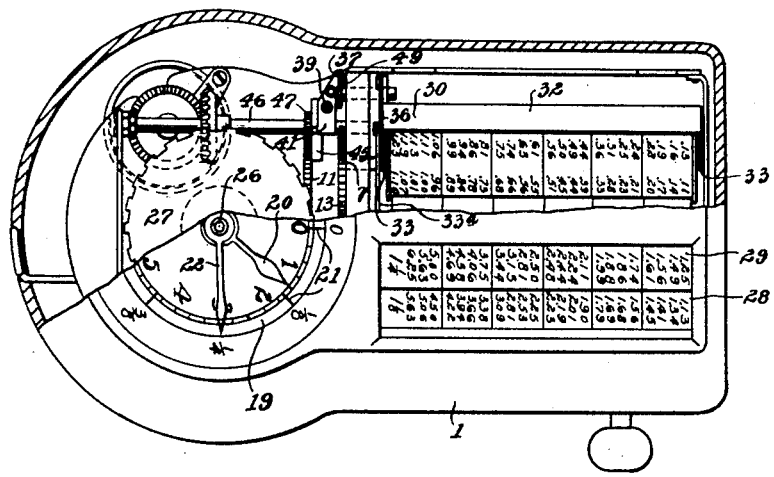
*Fig. 1*
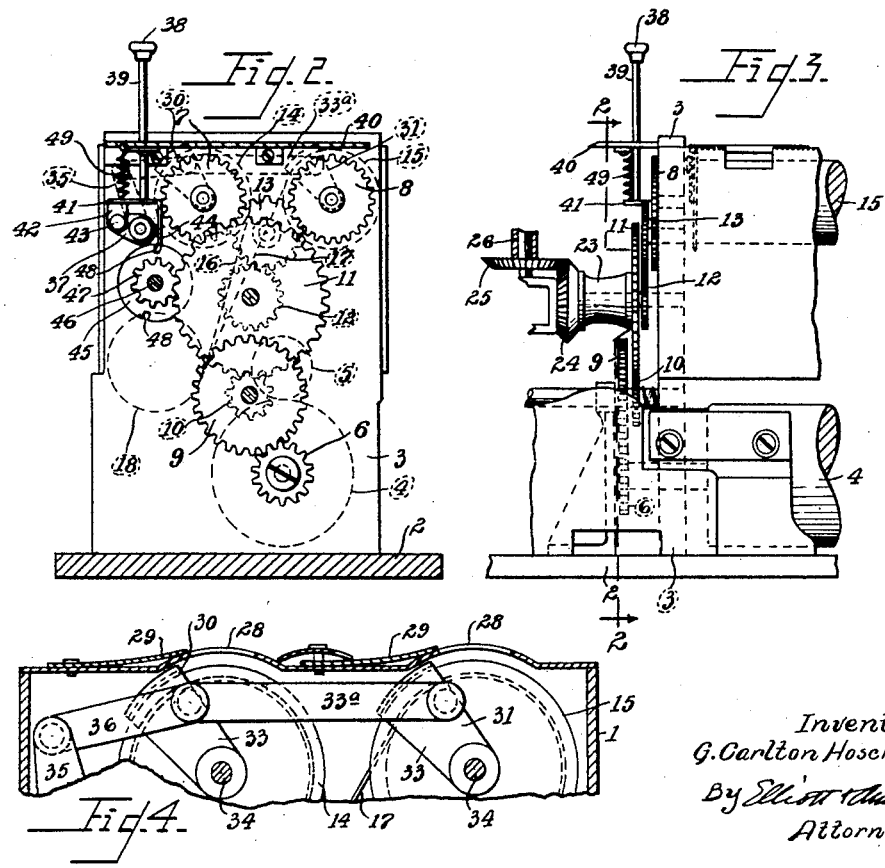
Inventor:
G. Carlton Hosch.
By Elliott Thurman
Attorneys.

UNITED STATES PATENT OFFICE.

GREENE C. HOSCH, OF ST. LOUIS, MISSOURI.

PUSH-BUTTON-CONTROLLED SHUTTER.

1,396,577. Specification of Letters Patent. Patented Nov. 8, 1921.

Application filed March 9, 1921. Serial No. 450,846.

*To all whom it may concern:*

Be it known that I, GREENE CARLTON HOSCH, a citizen of the United States, residing in the city of St. Louis and State of Missouri, have invented new and useful Improvements in Push-Button-Controlled Shutters, of which the following is a specification.

This invention relates to measuring or computing machines and particularly to that type of machine which embodies a length indicator and a chart or other means driven in unison with the length indicator and bearing computed numbers corresponding to different rates or prices per unit of measure and corresponding also to the length measured or indicated. Such machines are used largely for measuring fabric and the scale of the length indicator is usually provided with divisions corresponding to aliquot fractions of the unit of measure, and the computations on the chart correspond to these divisions and multiples of the unit of measure.

The object of the present invention is to provide simple means controlled by hand at the will of the operator to prevent the reading of the computed numbers on the chart unless the length indicated or measured is commensurable in the selected aliquot fraction, for example, eighths of a yard.

Further objects of the invention will appear hereinafter.

The invention consists in the novel features, and in the general combination of parts to be particularly described hereinafter, all of which contribute to produce a simple and efficient hand operated shutter control for measuring machines. A preferred embodiment of my invention will be particularly described in the following specification, while the broad scope of my invention will be pointed out in the appended claims.

In the drawing,

Figure 1 is a view showing a machine embodying my invention partially in plan and partially in horizontal section;

Fig. 2 is a vertical cross section through a machine about on the line 2—2 of Fig. 3 certain parts being omitted;

Fig. 3 is a side elevation of the mechanism of the machine with the casing removed, certain parts being broken away; and Fig. 4 is a vertical cross section taken through the upper portion of the frame of the machine and particularly illustrating the construction and mounting of the shutter which operates to normally screen the reading point on the chart.

Referring more particularly to the parts, 1 represents the casing within which there is provided a frame including a base plate 2 and a substantially vertical frame plate 3. The frame plate 3 supports the shaft of a measuring roller 4 with which coöperates a presser roller 5 (see Fig. 2). When the fabric to be measured is pulled between the rollers 4 and 5 the rotation of the shaft of the measuring roller is imparted through a pinion 6 and a gear train, to a pair of gear wheels 7 and 8 mounted in the upper part of the machine. The gear train may include a large gear wheel 9 meshing with the pinion 6 and carrying a rigid pinion 10 which meshes with a large gear wheel 11. This large gear wheel 11 in turn carries a large pinion 12 which meshes with a double gear 13 which in turn meshes with the gear wheels 7 and 8. When the measuring roller 4 is rotated its movement is thereby imparted to the gear wheels 7 and 8. These gear wheels are rigidly attached to the shafts of two take-up rollers 14, 15 which carry charts 16 and 17 which are normally wound upon a supply drum or spring roller 18 mounted in the lower portion of the casing. On the exterior of the casing I provide a length indicator which may be in the form of a dial or scale 19 (see Fig. 1) having large divisions indicating yards with which coöperate a yard pointer 20, and having divisions 21 which divide the circumference of the dial into eighths. With these aliquot fractional divisions or eighths, a fast moving pointer 22 coöperates. The present machine is designed to measure twelve yards and at each revolution of the fraction pointer 22 the yard pointer 20 will move through one yard space on the scale. These pointers 20 and 22 are driven by any suitable means in synchrony with the charts. A suitable driving means for this purpose may comprise a sleeve 23 rigid with the large gear wheel 11 and provided at its inner end with a bevel gear 24 which meshes with a bevel gear 25 on the lower end of a vertical tubular sleeve 26. The upper end of this sleeve 26 drives a reduction gear 27 through which the slow moving pointer 20 is driven. The charts in their movement present themselves under windows such as the window 28 in the cover of the case and each window is provided with a fixed scale 29 carrying figures indicating different prices per yard. The charts 28 carry computed figures arranged in rows, and these figures correspond to the different prices rates and to different lengths indicated by the pointers 20 and 22. These computed figures on the charts are computed progressively for all eighth yard measurements from zero up to twelve yards, and the figures are placed on the charts so that whenever the pointer 22 is in alinement with one of the fractional divisions 21 then the corresponding computed number will be visible at the reading point in the window 28.

According to my invention I provide means for normally screening the windows 28 so that the numbers cannot be seen unless the computations visible correspond exactly to the measurement indicated by the pointers. In order to accomplish this I provide two shutters 30 and 31 (see Fig. 4), and each shutter comprises a longitudinal bar 32 with arms 33 at the ends, and these arms are loosely mounted on the shafts 34 of the two rollers 14 and 15. The shutters are connected by a link 33ª. In the vertical plate 3 a lever or arm 35 is pivotally mounted and this arm is connected by a link 36 with one of the arms 33 of the adjacent shutter. This lever or arm is on the same side of the plate 3 as the charts. Rigid with this lever 35 but on the other side of the plate I provide another arm or lever 37. On the exterior of the casing 1, I provide a push button 38 or other hand actuated part, carried by stem 39 mounted to slide through the upper wall of the casing and through a horizontal guide plate 40. The lower end of this stem carries a bracket 41 in the form of a bent plate having an extension 42 which is loosely attached by a pin 43 to the arm or lever 37. At the other end of the bracket 41 the same is provided with a dog 44 which projects downwardly and extends toward the stop wheel 45. This stop wheel is rigid on a shaft 46 carrying a pinion 47 which meshes with the aforesaid large gear wheel 11. Furthermore the stop wheel is provided on its periphery with diametrically opposite recesses 48. The stop wheel rotates in synchrony with the movement of the fraction pointer 22 and makes a half turn for every eighth of a yard indicated by that hand. When the pointer or hand 22 is in alinement with one of the aliquot divisions, for example, as indicated in Fig. 1, one of the recesses 48 will be in alinement with the lower end of the dog 44 and this will permit the bracket 41 to descend when the push button 38 is depressed, thereby actuating the levers 37 and 35 to open the shutters. Normally neither of the recesses is in alinement with the dog and hence the arrangement of the stop wheel would prevent the dog from descending. In connection with these parts I provide a spring mounted in such a way that it will normally hold the shutters closed, for example, I may provide a simple coil spring 49 the lower end of which is attached to the bracket and the upper end of which is attached to the under side of the horizontal frame plate 40. Evidently this spring will normally hold the shutters closed and will return the shutters to their closed position after the stem 39 has been depressed.

It is understood that the embodiment of the invention described herein is only one of the many embodiments my invention may take, and I do not wish to be limited in the practice of my invention nor in my claims, to the particular embodiment set forth.

What I claim is:—

1. In a machine of the kind described, the combination of a length indicator having a scale with divisions for indicating aliquot fractions of the unit of measure, a driven pointer coöperating with the scale to indicate the length of goods measured, a movable indicating chart driven simultaneously with the pointer and bearing numbers for indicating computed figures corresponding to the length indicated by the length indicator, a movable shutter for normally screening the reading point to prevent the computed figures from being read, a hand actuated part connected to the shutter for opening the same, a movable stop for normally preventing the actuation of the hand actuated part, and means for driving the same in synchrony with the pointer, said movable stop having means coöperating with the hand actuated part to permit the actuation of the same only when the pointer coincides with one of the said fractional divisions on the scale.

2. In a machine of the kind described, the combination of a length indicator having a scale with divisions for indicating aliquot fractions of the unit of measure, a driven pointer coöperating with the scale to indicate the length of goods measured, a movable indicating chart driven simultaneously with the pointer and bearing numbers for indicating computed figures corresponding to the indications of the length indicator, a movable shutter for normally screening the reading point to prevent the computed figures from being read, a hand actuated part connected to the shutter for opening the same, a stop-wheel lying in the path of said hand actuated part for normally preventing the actuation of the hand actuated part, means for driving the stop wheel in synchrony with the pointer, said stop wheel having a recess adapted to aline with the hand actuated part and permit actuation thereof only when the pointer coincides with one of the said divisions on the scale.

3. In a machine of the kind described, the combination of a length indicator having a scale with divisions for indicating aliquot fractions of the unit of measure, a driven pointer coöperating with the scale to indicate the length of goods measured, a movable indicating chart driven simultaneously with the pointer and bearing numbers for indicating computed figures corresponding to the length indicated by the length indicator, a movable shutter for normally screening the reading point to prevent the computed figures from being read, a push button connected to the shutter for opening the same, a dog mounted to move when the push button is depressed, a stop wheel in the path of the dog and normally operating to prevent closing of the shutter by the push button, said stop wheel having a recess therein which may aline with the dog to permit the movement thereof when the push button is moved to open the shutter, and means for driving the stop wheel in synchrony with the said pointer so as to bring the recess into alinement with the dog when the pointer coincides with one of the fractional divisions of the scale.

4. In a machine of the kind described, the combination of a casing, a length indicator visible on the face of the casing and having a scale with divisions for indicating aliquot fractions of the unit of measure, a driven pointer coöperating with the scale to indicate the length of goods measured, a substantially vertical frame plate, a movable indicating chart driven simultaneously with the pointer located on one side of said frame plate, and bearing numbers to indicate computed figures corresponding to indications of the length indicator, a shutter pivotally mounted on the frame plate, a lever on the same side of the frame plate as the chart and connected with the shutter to control the same, a second lever rigid with the first named lever and located on the opposite side of the frame plate, a movable stem guided in said casing having a bracket connected with said second named lever for opening the shutter, a stop wheel normally preventing opening of the shutter, driven in synchrony with the pointer and having recesses in the periphery thereof, said bracket having a dog which may enter one of the recesses when alined therewith to permit the opening of the shutter, a spring mounted so as to normally hold the shutter closed, said recesses operating to aline with the dog whenever the pointer coincides with one of the said fractional divisions of the scale.

In testimony whereof, I have hereunto set my hand.

GREENE C. HOSCH.